March 21, 1944.  H. T. LAMBERT  2,344,933
BRAKE CONSTRUCTION
Filed Nov. 18, 1941  4 Sheets-Sheet 1
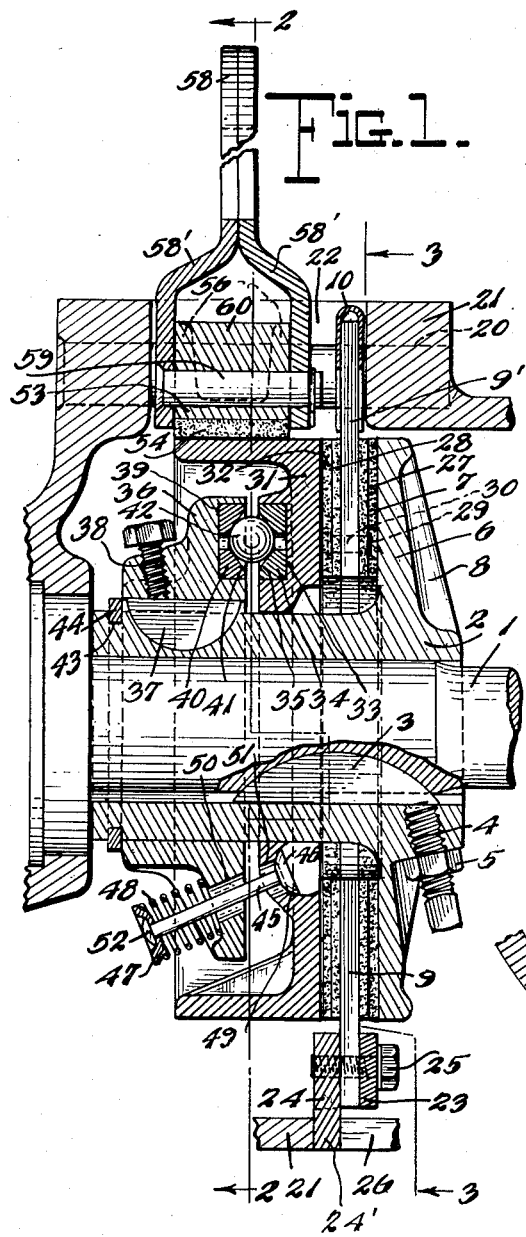
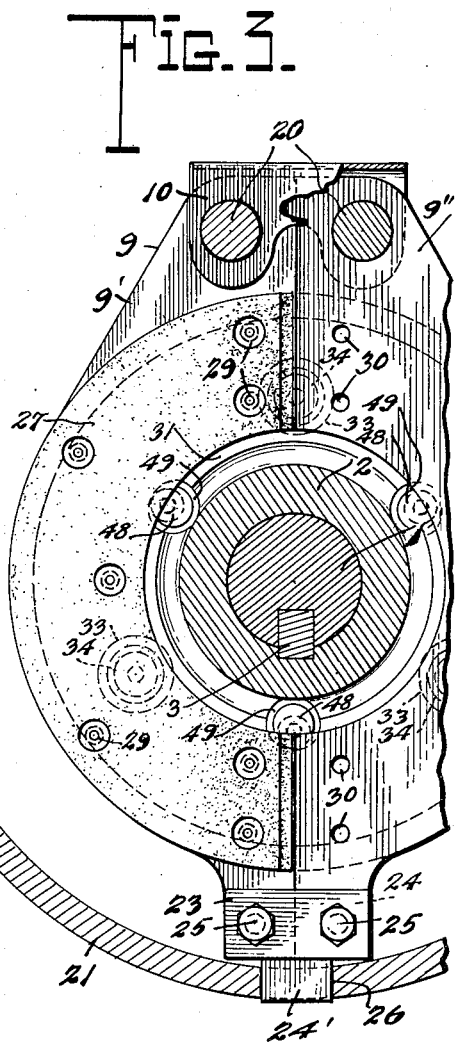
Inventor
H. T. LAMBERT
By Robb & Robb
Attorneys March 21, 1944.  H. T. LAMBERT  2,344,933
BRAKE CONSTRUCTION
Filed Nov. 18, 1941  4 Sheets-Sheet 2
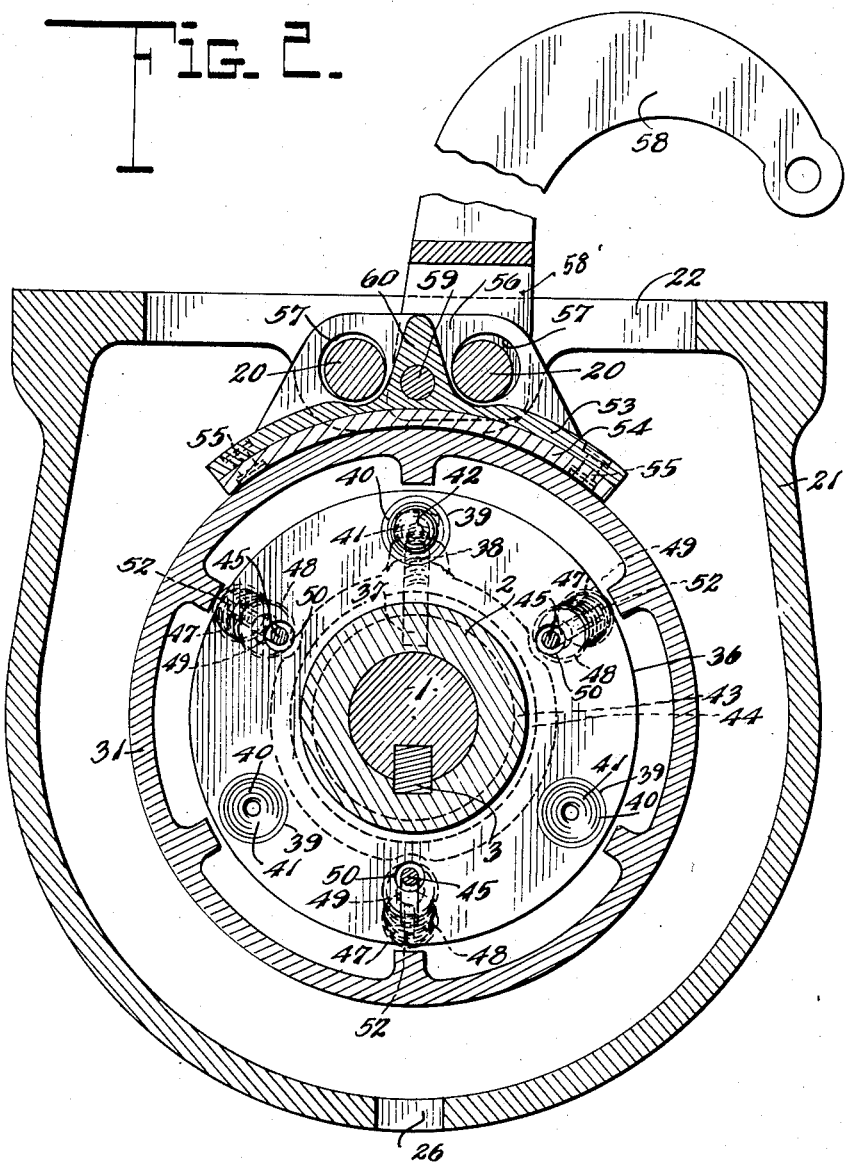
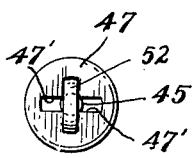
Inventor
H.T. LAMBERT
By Robb & Robb
Attorneys

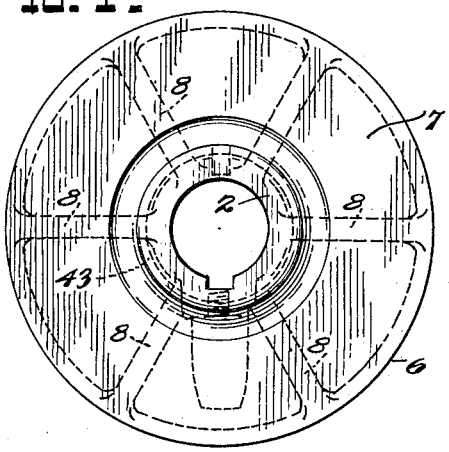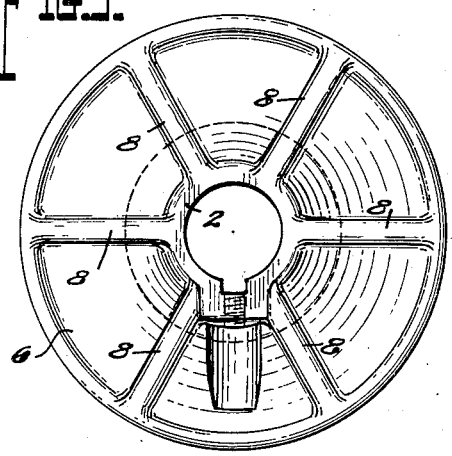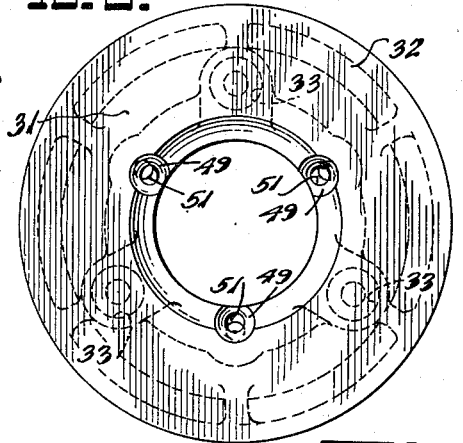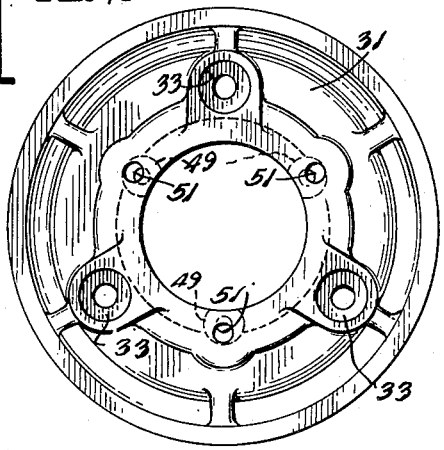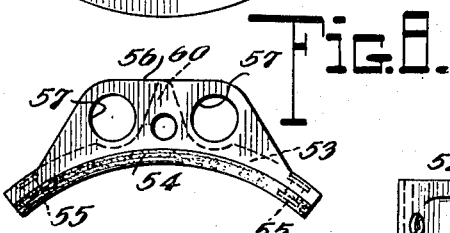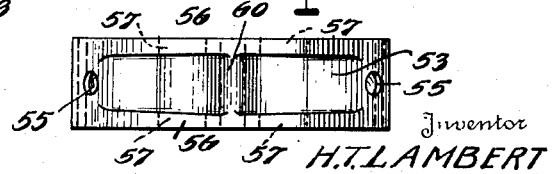

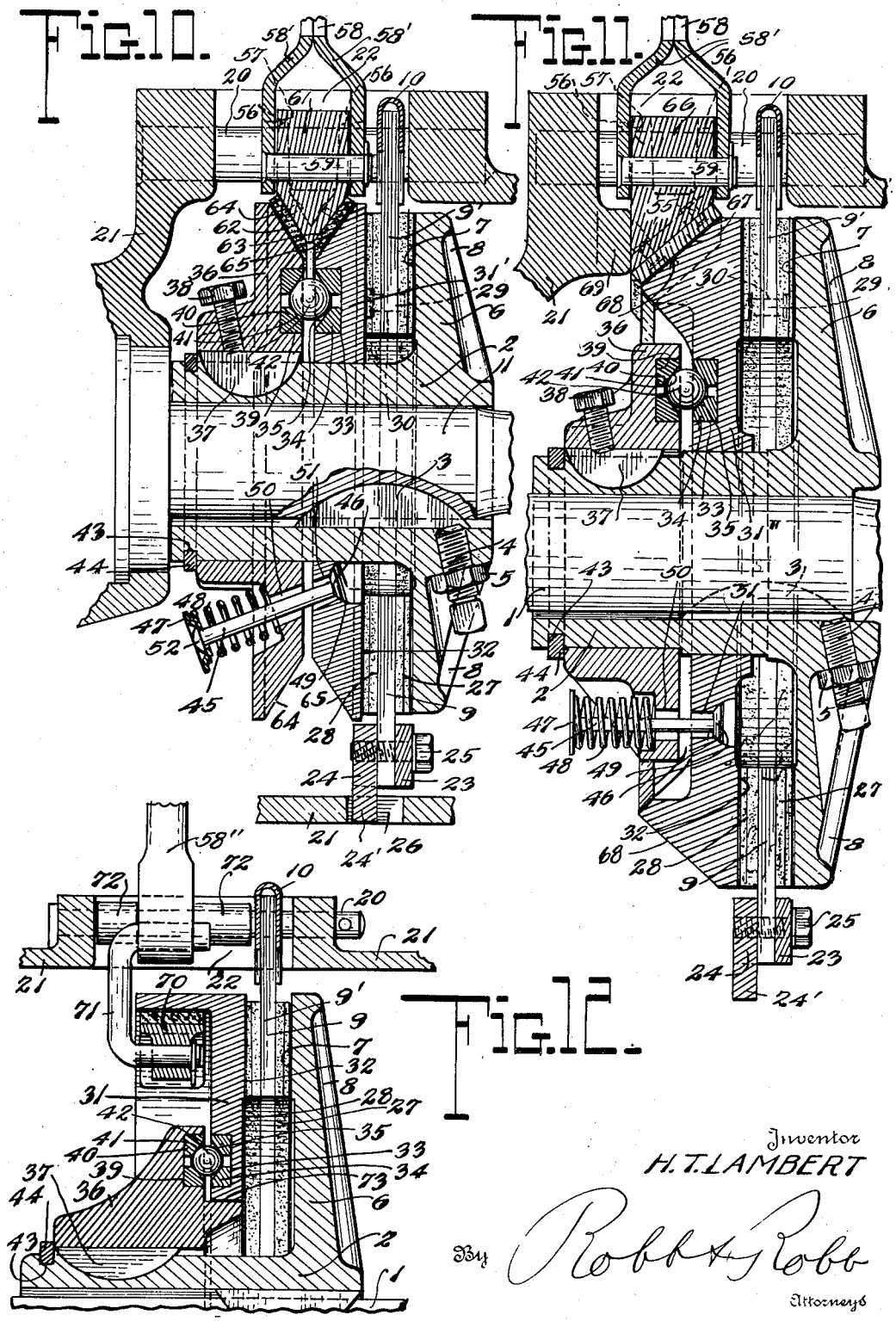

Patented Mar. 21, 1944

2,344,933

UNITED STATES PATENT OFFICE 2,344,933

BRAKE CONSTRUCTION

Homer T. Lambert, St. Joseph, Mich., assignor to The Lambert Brake Corporation, St. Joseph, Mich., a corporation of Michigan Application November 18, 1941, Serial No. 419,655

8 Claims. (Cl. 188—72)

This invention appertains to a new and improved brake construction primarily for use in braking of vehicles and industrial equipment, and for any and all purposes where accurate control of braking forces is desirable or necessary to prevent undue pressure for synchronizing the coordination of all parts of the braking system.

One of the primary objects of the invention is to provide an improved brake construction which is particularly useful where the space is limited for the mounting of the brake, yet affording convenient accessibility to the working parts thereof.

A further object of the invention is to provide an improved brake construction of the self-energizing or servo acting type, wherein the braking action is initiated in such a manner as to reduce the brake pedal travel which heretofore has been normally required, and the extent of which travel has heretofore been one of the primary objectionable features of hydraulic braking systems on vehicles.

A still further object of the invention is to provide an improved brake construction of such character that wear of the main brake linings will not effect the brake pedal travel, and which therefore lengthens the effective life of the brake to the point of virtually complete wearing out of the main brake linings.

Yet another object of the invention is to provide an improved brake construction which is especially smooth and uniform in operation, yet powerful, and which virtually eliminates the necessity for providing some syncronizing means such as heretofore have been required for certain adaptations, as for example, in braking systems for airplanes. In such adaptations, it is essential that the brake application be smooth and powerful, without any tendency to grab or produce undue alternating braking pressure on the different wheels to which the braking forces are normally applied. Because of the improved features of this invention, the problems peculiar to the application of brakes to airplanes are fully satisfied to the extent of an unusually high efficiency of operation of the brake, with virtually complete elimination of the difficulties heretofore existing.

To the foregoing ends, my invention contemplates the provision of an initial brake actuating force applied through means of a supplemental or auxiliary braking shoe which acts to impart a drag to a normally rotating part of the brake, and to thereby cause relative rotative movement between such normally rotating part and the servo actuating brake means which in turn energizes the main braking surfaces of the brake, the latter preferably having the form of discs which are provided with surfaces which on engagement, will produce a powerful braking action by friction.

Other and further objects of the invention will be hereinafter described, and the novel features thereof defined by the appended claims.

In the drawings:

Figure 1 is a vertical sectional view taken through a brake construction embodying my invention, certain of the parts being shown in elevation;

Figure 2 is a transverse sectional view taken on the plane of the line 2—2 of Figure 1, looking in the direction of the arrows;

Figure 3 is a transverse sectional view taken on the plane of the line 3—3 of Figure 1, also looking in the direction of the arrows, with certain of the parts broken away;

Figure 4 is a view in side elevation of the hub which is adapted to be mounted upon an axle or other rotary part to be braked, as viewed from the right-hand side of Figure 1, said hub also constituting one of the main braking elements in the brake assembly;

Figure 5 is a view of the hub generally similar to Figure 4, as seen from the reverse side thereof;

Figure 6 is a view in side elevation of the main brake drum through which the braking action is inititated and further applied by the servo acting means, said drum being viewed from the right-hand side of Figure 1;

Figure 7 is a view of the main brake drum of Figure 6, as seen from the reverse side thereof;

Figure 8 is a view in side elevation of the supplemental or auxiliary brake shoe by means of which the braking action is initiated according to the form of the invention shown in Figures 1 to 3;

Figure 9 is a top plan view of the brake shoe shown in Figure 8;

Figure 10 is a fragmentary vertical sectional view, generally similar to Figure 1, showing a modified form of brake assembly wherein the auxiliary brake shoe has substantially the form of a wedge in cross section, certain parts of the view being shown in elevation;

Figure 11 is a view generally similar to Figure 10, showing another modified form of the brake construction, wherein the supplemental or auxiliary shoe has a single inclined friction surface for engagement with a correspondingly inclined or conical brake drum;

Figure 12 is a view generally similar to Figures 10 and 11, showing a still further modified construction, wherein the supplemental or auxiliary brake shoe is mounted interiorly of the brake drum, as distinguished from the exteriorly mounted type illustrated in Figure 1; and Figure 13 is a plan view of the spring-retainer showing its cooperative engagement with the spring retainer pin.

Like reference characters designate corresponding parts in the several figures of the drawings.

Referring first to the construction illustrated in Figures 1 to 9 inclusive, 1 designates a drive shaft or other rotary part to be braked, and by means of which power may be transmitted to a wheel or any other rotary device. Mounted upon the shaft 1 is a hub 2 which is suitably fixed to the shaft for rotation therewith, as by means of a Woodruff key 3. A set screw 4 extending through the hub into engagement with the key 3 serves to fix the key in position and prevent accidental displacement thereof, the set screw being preferably provided with a jam nut 5 to prevent loosening of the set screw. The hub 2 is preferably provided with an integral disc portion 6 having an annular braking surface 7 at one side thereof, and a series of radial ribs 8 formed on its opposite side, said ribs serving to reinforce the disc 6 and to aid in dissipating heat generated by friction during operation of the brake.

Encircling the hub 2 in spaced relation thereto, and disposed at the side of the disc 6 next to the braking surface 7, is a friction disc 9, said fraction disc being preferably constructed in two complementary sections 9' and 9". The upper ends of the respective sections 9' and 9" are extended to be received in the channel of a clip member 10 which is generally U-shaped in cross section, and which serves to maintain the two disc sections 9' and 9" in a common plane. The clip member 10 and each of the disc sections 9', 9" are apertured to loosely receive therethrough a pair of mounting bolts 20, 20 carried by the brake housing 21. The brake housing is provided at its upper side with an opening 22 across which the mounting bolts 20, 20 extend and to receive the upper ends of the respective friction disc sections 9', 9", as clearly shown in Figure 1. Sufficiently clearance is afforded between the mounting bolts 20, 20 and the apertures in the disc sections 9', 9", and clip 10 to allow axial movement of the disc sections, as a unit, towards and away from the braking surface 7 of the disc 6. The lower ends of the respective disc sections 9', 9", are likewise extended and are rigidly secured together by means of tie plates 23 and 24, disposed at opposite sides of the disc sections and secured together, with the disc sections disposed therebetween, by means of clamping bolts 25, 25. One of the tie plates, as for example 24, is extended as at 24' beyond the corresponding extremities of the disc sections 9', 9", and this extended portion 24' is disposed in an elongated slot 26 provided in the housing 21, to allow free axial movement of the brake disc 9 as hereinbefore referred to. However, the width of the slot 26 is not substantially greater than the extension 24', so that lateral displacement or relative rotative movement of the disc 9 is prevented.

Disposed on one side of the friction disc 9 is a brake lining 27 of any suitable type, said lining being of annular form and arranged for frictional engagement with the annular braking surface 7 at the contiguous side of the brake disc 6. Likewise, the opposite side of the friction disc 9 carries another brake lining 28 of annular form, the two linings 27 and 28 being preferably attached to the disc 9 by rivets 29 which extend through suitable apertures 30 formed in the respective disc sections 9', 9".

Loosely mounted upon the hub 2 next to the friction lining 28 is a brake drum member 31, said drum member being free to rotate relative to the hub 2, and also being free to move axially on the hub for a purpose to be hereinafter more particularly described. At the side of the drum member 31 next to the friction disc 9, the drum member is provided with an annular braking surface 32 for frictional engagement with the lining. The drum member is further provided at its side opposite to the braking surface 32 with a plurality of sockets 33 spaced equi-distantly about the central axis thereof, each of said sockets having mounted therein an insert 34 provided with a conical recess 35, the walls of which conical recess constitute a cam surface. It is to be understood that while the brake drum is shown in the drawings as being provided with three inserts, the number of inserts may be increased or reduced, if preferred, although at least three inserts spaced 120° apart will be found to be the minimum requirement for most practical purposes.

Mounted upon and secured to the hub 2 is a member 36, hereinafter termed a power plate, said power plate being suitably fixed to the hub for rotation therewith as by means of a Woodruff key 37. A hollow pointed set screw 38 is preferably provided to hold the Woodruff key in position to insure a firm connection between the hub 2 and the power plate. The power plate is provided with a plurality of equally spaced sockets 39 to receive another set of inserts 40 similar to the inserts 34 in the brake drum 31. The inserts 40 are likewise provided with conical recesses 41 similar to the recesses 35. As will be seen from reference to Figure 1, the inserts 34 and 40 are arranged in opposed pairs about the axis of the brake assembly, and interposed between each pair of inserts is a ball 42 which coacts with the cam surfaces of the inserts to impart an axial thrust to the brake drum 31 incident to relative rotation between the brake drum and the power plate 36. The balls 42 and the inserts 34, 40 are preferably hardened to minimize wear. To aid in fixing the power plate 36 to the hub 2, and to back-up the power plate and thereby prevent axial movement of the power plate by the reaction of the thrust transmitted to the brake drum 31 by the balls 42 and cam surfaces 35 and 41, the hub is preferably provided with an annular groove 43 in which is disposed a snap ring 44.

In order to afford clearance between the main braking surfaces which are constituted by the brake drum 31, disc 9, and the disc 6, under conditions of free rotation of the drive shaft 1 without application of the brake, the brake drum 31 is normally yieldably urged away from the disc 9, that is, towards the power plate 36, it being understood that the brake drum is free to move axially, to a limited extent, on the hub 2. The means for yieldably urging the brake drum towards the power plate as aforesaid, preferably comprises a plurality of bolts or pins 45 loosely extended through the power plate 36 and the brake drum 31 respectively, at an angle to the central axis of the brake assembly, as clearly shown in Figure 1, said pins being each provided with a conical head 46 at one end thereof, and with a detachable spring seat or retainer 47 at the opposite end. Encircling each pin 45 is a coil spring 48 which is normally compressed between the spring seat 47 and the back of the power plate 36, to exert pressure upon the pin 45 in a direction tending to draw the brake drum 31 away from the friction disc 9 and towards the power plate. The pins 45 and their spring assemblies are preferably arranged in equally spaced relation to each other about the central axis of the brake assembly, and are preferably displaced midway between the ball and cam insert members hereinbefore described. In a construction employing three sets of ball and cam inserts, the brake is likewise preferably provided with three sets of pins and spring assemblies, although the number of these parts may be varied more or less as desired. The conical head 46 of each pin 45 is preferably seated in a conical recess 49 formed in the main braking face of the brake drum 31, and the openings in the power plate and brake drum, as indicated at 50 and 51 are substantially greater than the pin 45 extending therethrough to allow sufficient clearance to permit the brake drum 31 to be angularly or rotatably displaced to a limited extent, relative to the power plate 36, under conditions which will be more fully described hereinafter.

To permit the spring seats or retainers 47 to be removed from the pins 45, each pin is provided with an elongated head 52 which is flattened at opposite sides, and the spring seat or retainer 47 is provided with an elongated slot of a size sufficient to pass over the head 52 when aligned therewith. In assembling the spring seat or retainer 47 on its pin 45, the elongated slot above referred to is aligned with the head 52 and the spring seat is passed onto the pin to a position behind the head, whereupon the spring seat may be turned 90° more or less to mis-align the slot therein relative to the head 52, thereby causing the spring seat to assume a position firmly abutting the head 52. By following the assembly operations in the reverse order, the spring seats 47 may be removed from the pins 45 to permit disassembly of the brake drum 31 for purposes of repair or placement when occasion requires, and to afford access to the balls 42 and cam inserts 34, 40.

Mounted exteriorly of the brake drum 31, and arranged for engagement with the outer periphery thereof, is an arcuate brake shoe 53, said shoe being preferably provided with a friction lining 54 suitably attached thereto as by means of rivets 55. The brake shoe 53 is extended upwardly at its opposite sides to form spaced ears 56, 56 each having spaced apertures 57, 57 provided therein and aligned with corresponding openings in the other ear to receive the mounting bolts 20, 20 which guide the brake shoe 53 as well as the friction disc 9. The apertures 57, 57 are preferably somewhat larger than the mounting bolts 20, 20 to permit the brake shoe to move freely towards and away from the periphery of the brake drum 31, in a manner now to be described. This clearance also permits the brake shoe to move laterally on the mounting bolts under conditions of axial movement of the brake drum 31 on the hub 2 during the braking operation, although in the actual construction, lateral movement of the shoe, if any, is not perceptible.

Pivotally mounted on one of the mounting bolts 20 is a brake actuator lever 58, the same being preferably bifurcated at its lower end, as at 58', 58', to span the brake shoe 53. The bifurcated end of the brake lever is in turn pivotally connected to the brake shoe 53 by means of a pin 59 which is extended transversely through the brake shoe at about the center thereof where the brake shoe is provided with a transverse reinforcing rib 60 lying between the spaced ears 56, 56.

In the operation of the brake as hereinbefore described, a limited and light rocking movement may be suitably imparted to the actuator lever 58, which in turn serves to bring the auxiliary brake shoe 53 into frictional engagement with the outer periphery of the brake drum 31. Assuming that the drive shaft 1 is rotating, it will be understood that the main brake disc 6, which is an integral part of the hub 2, is also rotating, as well as the brake drum 31 and the power plate 36. On frictional engagement of the auxiliary brake shoe 53 with the brake drum 31, a drag will be imparted to the latter, causing the brake drum to become angularly or rotatively displaced relative to the power plate 36. This displacement, in turn, produces a rolling action of the balls 42 on the camming surfaces of the inserts 34, 40, thereby imparting a powerful axial thrust to the brake drum 31, bringing the braking surface 32 of the brake drum into frictional engagement with the friction lining 28 on the friction disc 9. Since the friction disc 9 is free to move axially, the other friction lining 27 on the opposite side thereof is brought into frictional engagement with the braking surface 7 on the friction disc 6. The frictional engagement of the main braking surfaces 32 and 7 with the friction linings carried by the friction disc 9, aids in producing a relative rotative displacement of the main brake drum respecting the power plate 36, in the manner of a self-energizing or servo action, which is initiated by the frictional engagement of the auxiliary brake shoe 53 with the brake drum 31. The braking forces produced by the main braking surfaces thereby become very powerful even with a very slight and light brake actuation applied through the brake lever 58, resulting in a smooth but rapid deceleration of the drive shaft 1 or other rotary part which is to be braked.

It will be obvious from the foregoing that since the braking action is always initiated by the auxiliary brake shoe 53, a highly efficient braking action can be maintained throughout the full life of the main brake linings 27 and 28. Wear of the main brake linings 27 and 28 does not affect the initiation of the braking action produced through the auxiliary brake shoe 53, and does not result in any increased movement of the brake lever 58 and its control mechanism such as a brake pedal (not shown), which increased movement is generally found to be necessary and a very detrimental and objectionable feature in practically all brake installations hereinbefore in use. Since the braking action is only initiated by the auxiliary brake shoe 53, and the frictional engagement of the lining 54 with the brake drum 31 is relatively light, wear of this lining 54 is reduced to a minimum, and is virtually negligible, thereby contributing to the long life of the brake assembly without repair or replacement of the operating parts.

It will be further understood that by virtue of the absence of any affect of wear of the main brake linings 27 and 28 upon the initiation of the brake application through the auxiliary brake shoe 53, it becomes unnecessary to employ any synchronizing means for a multiple brake system using my improved brake construction.

Passing now to the modified brake construction, shown in Figure 10 of the drawings, it will be seen that the brake assembly and operation is generally the same as hereinbefore described with reference to Figures 1 to 9 inclusive. The primary difference resides in the use of an auxiliary shoe 16 which is V or wedge-shaped in transverse cross section. The oppositely inclined sides of the shoe 61 carry friction linings 62 and 63, for cooperation with correspondingly inclined braking surfaces 64 and 65 on the power plate 36 and main brake disc 31'. Thus, in applying the brake by movement of the auxiliary brake shoe 61 into frictional engagement with the braking surfaces 64, 65, the auxiliary shoe tends to thrust the main brake disc 31' away from the power plate 36 in the manner of a wedging action, while at the same time imparting a preliminary braking action to the power plate which is fixed to the hub 2 for rotation therewith, as well as applying a drag to the main brake disc 31' to cause a limited relative rotative movement of this disc respecting the power plate, and hence producing a self-energizing or servo action which results in a powerful braking force at the main braking surfaces.

Similarly, the modified construction shown in Figure 11 is much the same as in the other forms of the invention previously described, differing primarily from Figure 10 by the provision of an auxiliary shoe 66 which may be characterized as a half wedge-shape in transverse cross section. The auxiliary shoe 66 preferably carries a friction lining 67 which engages a correspondingly inclined surface 68 on the main brake disc 31'', which in this instance has substantially the form of a frustum of a cone. In this form of construction, the housing 21 is inwardly extended as at 69 to form an abutment or backing member at the side of the auxiliary shoe 66, to prevent lateral displacement of the shoe in a direction opposite to the axial movement of the main disc 31'' during the initiation of the brake application on movement of the shoe into engagement with the surface 68 of the disc 31''.

Figure 12 shows a still further modified construction, wherein the auxiliary shoe 70 is arranged within the brake drum 31 for engagement with the inner periphery thereof, instead of the outer periphery as in Figure 1. According to this modified construction, the shoe 70 is connected by a link 71 to the brake actuator lever 58'', which latter is in turn pivotally mounted upon one of the mounting bolts 20 carrying spacers 72, 72 at opposite sides of the actuator lever. As a further modification, it will be seen that the brake drum 31 is mounted upon an axially extended shoulder 73 formed integrally with the power plate 36, it being understood of course that the drum is free to turn on this shoulder relative to the power plate, and is also free to move axially towards and away from the power plate. This construction has the advantage of being especially compact.

While the specific details have been herein shown and described, the invention is not confined thereto, as changes and alterations may be made without departing from the spirit thereof as defined by the appended claims.

I claim:

1. In a brake for applying a braking action to a rotatable drive shaft or the like, a casing, a hub adapted to be mounted upon said drive shaft and fixed thereto for rotation therewith, said hub being radially flanged at one end to provide a braking surface of disc form, an angularly fixed friction disc loosely disposed about the hub adjacent to said hub disc and axially movable towards and away from the same, a third brake disc disposed upon the hub adjacent to the friction disc aforesaid and at the side of the latter opposite to the hub disc, said third brake disc being freely rotatable about the hub and axially movable towards and away from the friction disc and hub disc, and having a braking surface at its side next to the friction disc, a power plate mounted on the hub adjacent to said third brake disc and fixed to the hub for rotation therewith, relatively movable cam and roller means interposed between the power plate and said third brake disc for normally causing rotation of said third brake disc with said power plate and for imparting an axial thrust to said third brake disc incident to rotation of the latter relatively to the power disc, and means engageable with said third brake disc for imposing a drag thereon to cause a limited rotation of said third brake disc relative to said power plate, and thereby causing braking engagement of said third brake disc, said friction disc and said hub disc, said engageable means comprising a segmental friction shoe, and a lever pivotally connected to said shoe and to the casing for maintaining retarding engagement of the shoe with the third brake disc and release of such shoe.

2. Apparatus as defined in claim 1, in combination with means for normally yieldably urging said third brake disc toward said power plate and away from said friction disc and hub disc to afford clearance between the braking surfaces thereof excepting on initiation of a braking application through actuation of the drag means.

3. Apparatus as defined in claim 1, wherein the brake shoe is rockable about the pivot connections of the lever, and said third brake disc is axially extended adjacent to its periphery to provide an annular surface which is engageable with the friction shoe.

4. Apparatus as defined in claim 1, wherein the hub and drive shaft are reversibly rotatable and said shoe is rockable about the pivotal connection with the lever, and said third brake disc is axially extended adjacent to its periphery to provide an annular surface which is engageable with the friction shoe.

5. Apparatus as defined in claim 1, wherein the drag means has the form of an arcuate friction shoe, and said third brake disc is rotatable in reverse directions and is axially extended adjacent to its periphery to provide an annular surface which is engageable with the friction shoe, in combination with actuator means for moving said frictoin shoe radially towards and away from the surface on said third brake disc which is engageable with the friction shoe aforesaid, said actuator means comprising a pivotal actuator lever pivotally connected with the friction shoe to permit the shoe to rock about said pivotal connection incident to braking operation according to the direction of rotation of the third brake disc.

6. In a brake, the combination with a plurality of brake members, one of said brake members being reversely rotatable by a part to be braked and another of said brake members being freely rotatable in reverse directions according to the direction of rotation of the first brake member and axially movable relative to the first-mentioned brake member to produce a braking action by frictional engagement of said brake members, of friction means acting upon said freely rotatable and axially movable brake member in either direction of rotation thereof to cause relative rotative movement thereof independently of the frictional engagement of the brake members as aforesaid, and means responsive to said relative rotative movement aforesaid to frictionally engage the brake members to produce a braking action, said friction means serving to produce a force having components acting both angularly and coincident with respect to the direction of frictional engagement of the brake members, and means for resisting lateral displacement of said friction means in one direction during braking operation.

7. In a brake, a plurality of brake members, one of said brake members being rotatable by a part to be braked and another of said brake members being freely rotatable and axially movable relative to the first-mentioned brake member to produce a braking action by frictional engagement of said brake members, and a third brake member interposed between said first-mentioned brake members, said third brake member being angularly stationary but axially movable relative to the other brake members, means acting upon said freely rotatable and axially movable brake member to cause relative rotative movement thereof independently of the frictional engagement of the brake members as aforesaid, and means responsive to said relative rotative movement aforesaid to frictionally engage the brake members to produce a braking action, said means including a power plate rotatable with the part to be braked and having a braking surface engageable by the means acting to cause independent relative rotative movement of the brake members aforesaid.

8. In a brake, the combination with a plurality of brake members, one of said brake members being rotatable by a part to be braked and another of said brake members being freely rotatable and axially movable relative to the first-mentioned brake member to produce a braking action by frictional engagement of said brake members; of friction means acting upon said freely rotatable and axially movable brake member to cause relative rotative movement thereof independently of the frictional engagement of the brake members as aforesaid, and means responsive to the relative rotative movement of the freely rotatable and axially movable brake member to produce the braking action by frictional engagement of the brake members as aforesaid, said last-named means comprising a member rotatable by the part to be braked and disposed adjacent to the freely rotatable and axially movable brake member, cam means carried by said member which is rotatable by the part to be braked and the freely rotatable and axially movable brake member, and arranged in opposing relation, and rolling means interposed between the cam means, and said friction means having the form of a friction shoe substantially V-shape in transverse cross-section interposed between the freely rotatable and axially movable brake member and the adjacent member, which is rotatable by the part to be braked, said latter adjacent member and said freely rotatable and axially movable brake member being provided with oppositely inclined surfaces respectively for frictional engagement with the friction shoe aforesaid.

HOMER T. LAMBERT.